United States Patent [19]

Kress et al.

[11] 4,194,584
[45] Mar. 25, 1980

[54] VARIABLE TERRAIN VEHICLE

[76] Inventors: George H. Kress, 10245 Arizona Cir., Bethesda, Md. 20034; James F. Delany, 1815 Horseback Trail, Vienna, Va. 22180

[21] Appl. No.: 925,633

[22] Filed: Jul. 17, 1978

[51] Int. Cl.² .................. B62D 55/14; B62D 55/24; B62D 55/30
[52] U.S. Cl. ..................... 180/9.24 R; 180/6.5; 180/6.7; 180/9.32; 280/5.22; 280/80 B; 280/638; 305/22; 305/30; 305/32
[58] Field of Search ............... 305/32, 29, 15, 22, 305/30; 180/9.24 R, 9.32, 9.2 R, 9.24 A, 8 A, 8 F, 6.5, 6.7; 280/5.22, 638, 80 B

[56] References Cited

U.S. PATENT DOCUMENTS

| | | | |
|---|---|---|---|
| 1,516,578 | 11/1924 | Platt | 305/29 X |
| 3,195,910 | 7/1965 | Steiner | 280/5.22 |
| 3,231,290 | 1/1966 | Weyer | 280/5.22 |
| 3,276,531 | 10/1966 | Hale et al. | 180/9.24 R |
| 3,529,688 | 9/1970 | Bruce | 180/9.24 R |
| 3,826,325 | 7/1974 | Purcell et al. | 305/22 X |
| 3,869,011 | 3/1975 | Jensen | 280/5.22 X |

FOREIGN PATENT DOCUMENTS

| | | | |
|---|---|---|---|
| 683352 | 11/1939 | Fed. Rep. of Germany | 180/9.24 R |
| 847550 | 8/1952 | Fed. Rep. of Germany | 305/30 |

*Primary Examiner*—Charles A. Marmor
*Attorney, Agent, or Firm*—Emory L. Groff, Jr.

[57] ABSTRACT

A vehicle undercarriage includes a pair of track laying assemblies each provided with at least two pairs of wheels having an endless belt tread wrapped thereabout. Variation of the vehicle wheelbase is achieved upon actuation of an extend/retract device serving to displace in a fore and aft direction at least one wheel of each track laying assembly. Further actuation of the same extend/retract device or of a separate variable pitch assembly produces an elevation or depression with respect to a horizontal plane, of at least one distal portion of each track laying assembly to accommodate varying terrain while also altering the size of the tread footprint. During all of the displacements of the tread, a take-up assembly automatically absorbs and lets out excessive portions of the endless belt tread. An improved tread construction provides a medial rib offering an axially-extending ground engaging contact surface.

23 Claims, 11 Drawing Figures

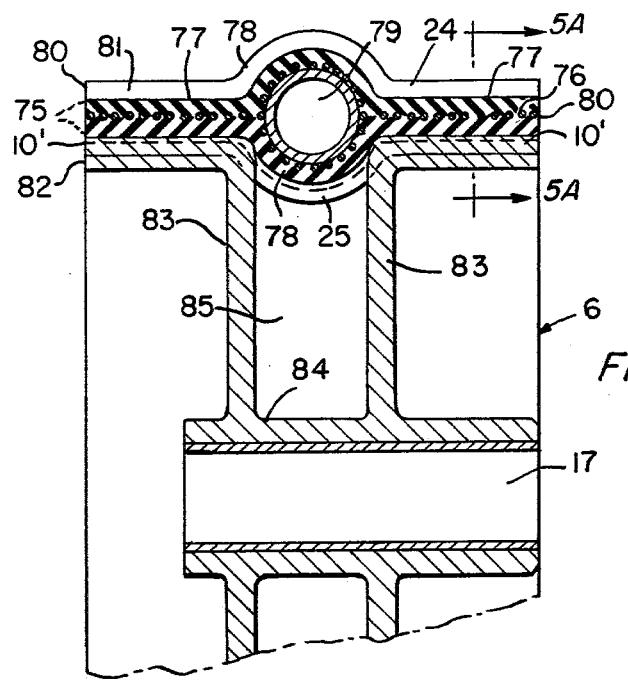
FIG. 5.
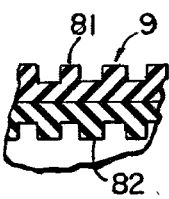
FIG. 5A.
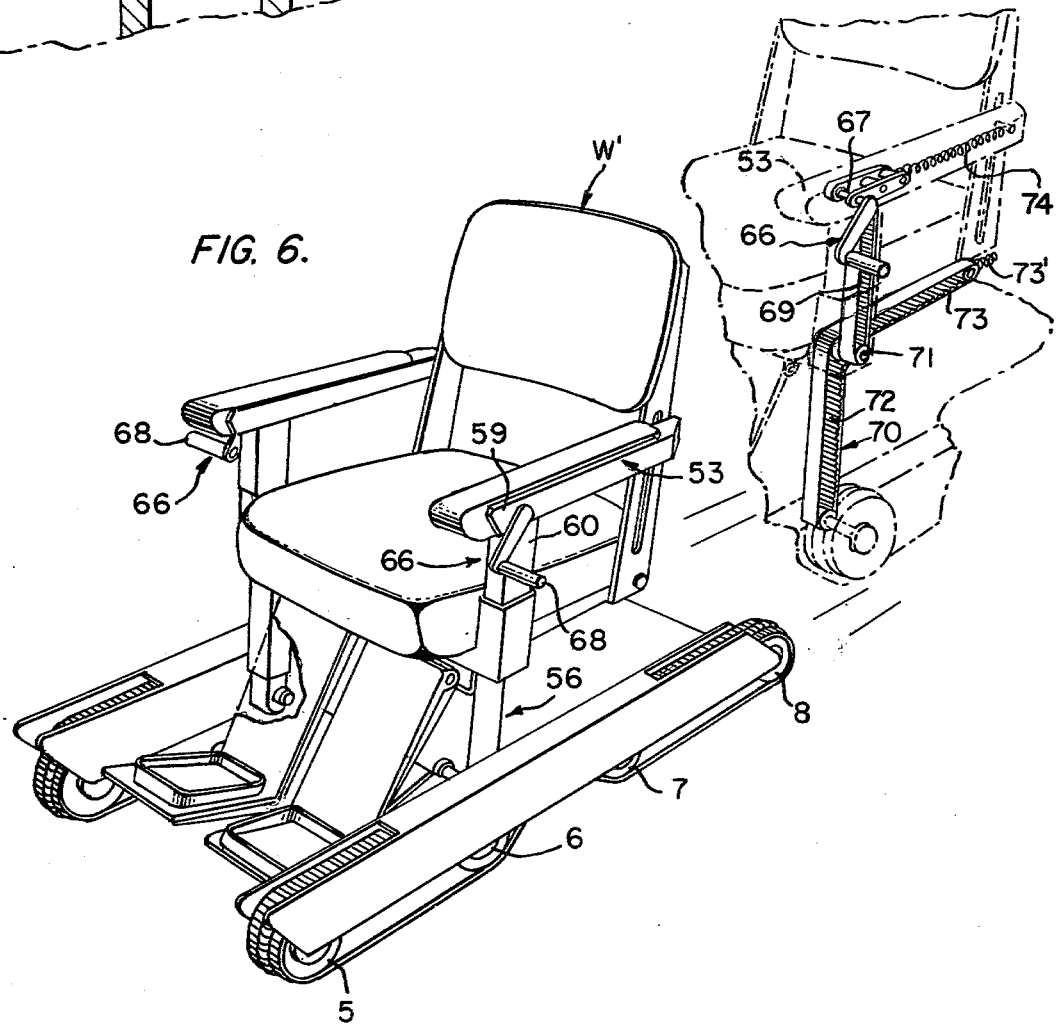
FIG. 6.
FIG. 6A

VARIABLE TERRAIN VEHICLE

This invention relates generally to a transport mechanism, and more particularly to an improved variable terrain vehicle which may be either manually or electrically driven.

BACKGROUND OF THE INVENTION

By the present invention a unique vehicle undercarriage is offered which may be utilized for the transport of either merchandise supported directly upon its base or may be combined with a suitable superstructure such as a chair assembly for the transport of an individual. Maneuverability of the vehicle is significantly enhanced by the provision of extendable and retractable support assemblies which may be selectively actuated to achieve a variable wheelbase. The terrain or supporting surface is engaged at all times by an endless track, belt or tread on both sides of the vehicle which cooperate with unique take-up means automatically absorbing and letting out portions of the tread during variation of the effective vehicle wheelbase. Variations in the supporting terrain are readily accommodated by the present invention in view of novel variable pitch means included in the support assemblies and which are actuated to elevate or depress the distal portion of each end of the treads as elevated obstacles or depressions are encountered during the forward or rearward movement of the vehicle.

Alternative mechanisms are proposed for achieving variation of the effective length of the present vehicle wheelbase. In one aspect, fore and aft track drive assemblies are rectilinearly displaced between retracted and extended positions while another embodiment includes pivotally attached track assemblies displaceable about the distal portions of each track and swingable to alter the effective ground-engaging portion of the tracks. An important feature to realize is that in all of the variable positions of all embodiments an endless track belt is employed with means automatically accumulating and paying out the exact running length of belt required according to the position of the various belt-engaging components.

Countless attempts have been made in the past to provide vehicles capable of negotiating irregular terrain and or possessing means faciliting maneuverability around or between obstacles and the present invention seeks to offer vastly improved means of an extremely compact nature yet possessing transport maneuverability not found in many known devices. With the present arrangement the vehicle undercarriage may readily negotiate narrow passageways and make relatively sharp turns while traversing supporting surfaces of even shiftable composition such as sand. In one selected mode, the instant vehicle may be adjusted to offer an extremely short wheelbase presenting contact with the supporting surface comprising only four transverse lines at the distal portions of the two spaced apart support assemblies while a simple manipulation achieves an appreciably extended wheelbase offering four relatively large foot-prints each presenting a substantially wide and long contact with the supporting surface.

Additionally, track belts having an improved construction are provided. By means of a central, longitudinally extending core each belt presents a medially localized contact surface or footprint with the underlying supporting surface thereby further enhancing the maneuverability of the apparatus. By employing either a solid or a semi or fully pneumatic belt core it will be appreciated that further adaptability is achieved to allow compatability with various types of supporting surfaces, whether they are smooth, rough, hard or shiftable.

Accordingly, one of the objects of the present invention is to provide an improved variable terrain vehicle having a motorized undercarriage including a pair of endless track drive mechanisms having means for altering the wheelbase thereof.

Another object of the present invention is to provide an improved variable terrain vehicle including track drive means having fixed-length endless tracks cooperating with means automatically vertically or horizontally taking up and letting out of slack in the belt during the alteration of the effective wheelbase of the vehicle.

Still another object of the present invention is to provide an improved variable terrain vehicle including track drive assemblies provided with pivotally displaceable subassemblies at their distal portions operable to extend/retract and/or vary the pitch of the fore and aft portions of the vehicle track.

Another object of the present invention is to provide an improved variable terrain vehicle including a pair of endless belt tracks supported about rollers variably positioned to offer either a line contact with the supporting surface therebeneath or a broad footprint having a substantial longitudinal and transverse extent.

Still another object of the present invention is to provide an improved variable terrain vehicle including an endless track drive provided with a flexible belt having a central, longitudinally extending core projecting beyond both surfaces of the track and which may be solid, semi-pneumatic or pneumatic.

Another object of the present invention is to provide an improved variable terrain vehicle including an endless track drive manually actuated by means of an occupant-controlled belt or chain mechanism.

With these and other objects in view which will more readily appear as the nature of the invention is better understood, the invention consists of the novel construction, combination and arrangement of parts hereinafter more fully described, illustrated and claimed.

BRIEF DESCRIPTION OF THE DRAWINGS

FIG. 5 is an enlarged fragmentary cross-sectional view taken along the line 5—5 of FIG. 2;

FIG. 5A is a fragmentary longitudinal sectional view taken along the line 5A—5A of FIG. 5;

FIG. 6 is a front perspective view of a modification of the vehicle of FIGS. 3–4;

FIG. 6A is a partial phantom view of the vehicle of FIG. 6 illustrating manual drive means;

Figure 1:
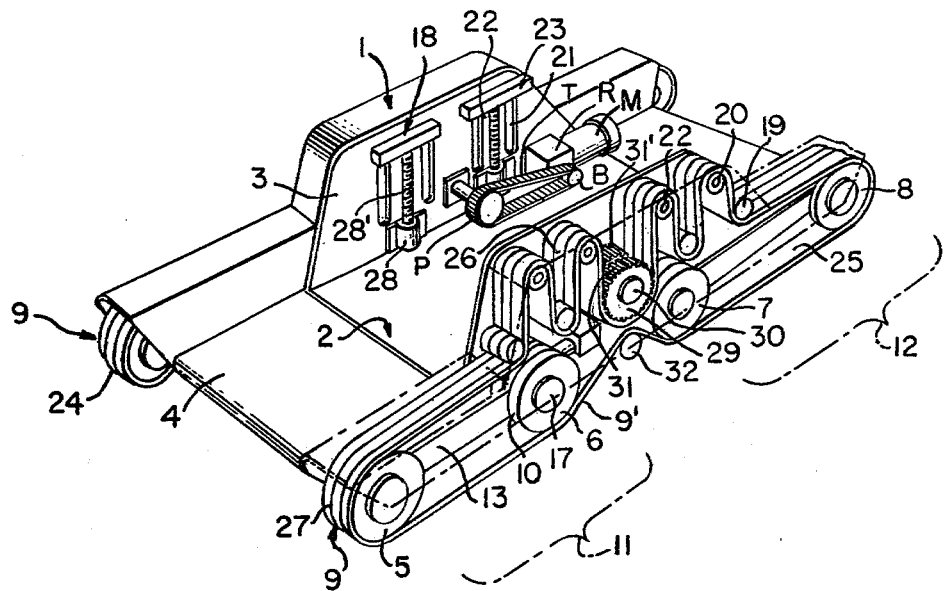
FIG. 1 is a front perspective view of a variable terrain vehicle according to the present invention.
Figure 2:
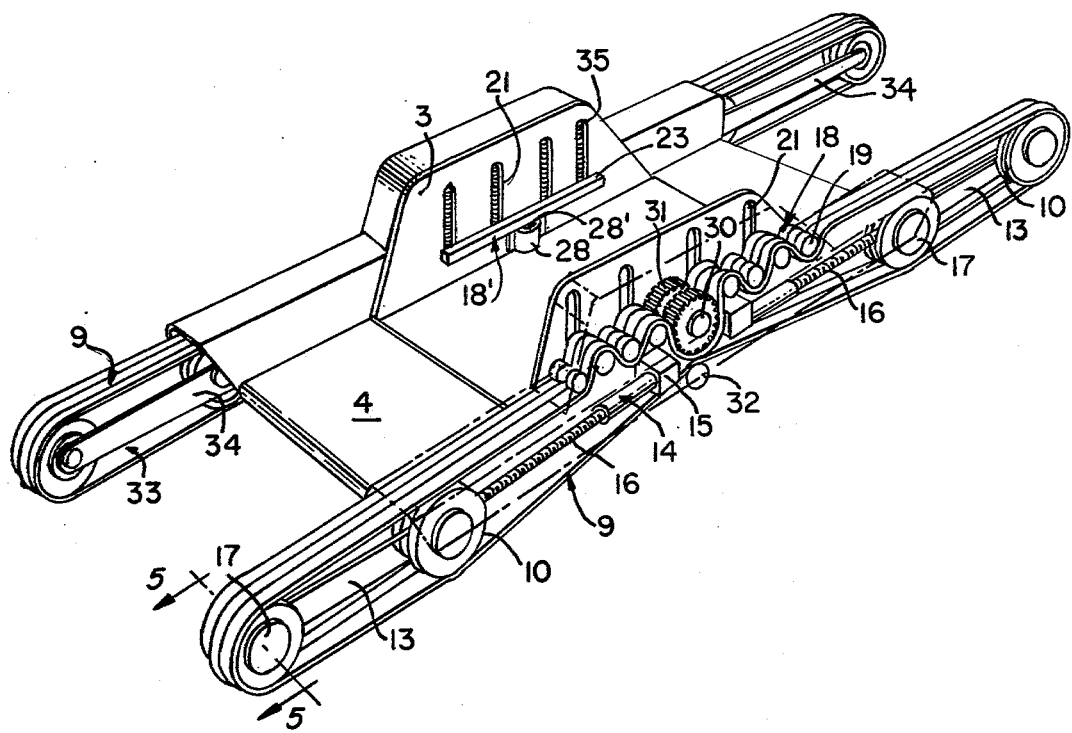
FIG. 2 is a front perspective view illustrating the undercarriage of a modified vehicle and as it appears when in the extended position.

Referring now to the drawings, particularly FIGS. 1 and 2, the present invention will be seen to comprise a variable terrain vehicle including an undercarriage, generally designated 1, and including a frame 2 joined to a pair of laterally spaced apart and vertically disposed side walls 3—3. Associated with the horizontal base 4 of the frame 2, and normally disposed substantially below the plane of this base, are a plurality of tread wheels 5, 6, 7 and 8 adjacent each of the two side walls 3—3. The plurality of tread wheels disposed on either side of the undercarriage 1 are longitudinally aligned one behind the other and parallel to the longitudinal axis of the undercarriage to insure that each set of associated wheels will roll along a single track or path when the vehicle is propelled in a straight direction, either forwardly or rearwardly.

An improved mobility and vastly superior capability to negotiate restricted passageways and variable terrain is provided in the present invention by means of a unique assembly of each set of the tread wheels 5–8 and the encircling endless tracks or treads 9 which engage at least a portion of the outer periphery 10 of all of the tread wheels of each set at all times.

On each side of the undercarriage 1, one of the outboard tread wheels 5 and the adjacent inboard wheel 6 serve to form a front support assembly 11 while the remaining outboard tread wheel 8 and its adjacent inboard wheel 7 comprises a rear support assembly 12. Each paired front and rear support assemblies cooperate to form a track laying assembly.

During use of the subject vehicle the two laterally adjacent pairs of front support assemblies 11 and rear support assemblies 12 are selectively displaced forwardly and rearwardly respectively, in a direction parallel to the longitudinal center axis of the undercarriage 1, between the alternate positions as illustrated in FIGS. 1 and 2 of the drawings. Concurrently with the aforementioned displacement of the two pairs of support assemblies, there is produced an alternate extension or contraction/retraction of the available or effective length of the endless treads 9. Preferably, the displacement of each lateral pair of support assemblies is produced equally and simultaneously, not only with respect to one another but also with respect to the other forwardly or rearwardly disposed pair of laterally adjacent support assemblies 11-12. The foregoing described arrangement will be understood to allow of a selective variable wheel-base for the subject vehicle whereupon each of the endless tracks 9 may be adjusted to present additionally a terrain-engaging tread or foot-print of varying dimensions, thus notably enhancing the ability to more efficiently and smoothly traverse a given support surface under differing circumstances and with various objects or loads disposed upon the vehicle undercarriage.

To carry out the essence of the present invention, means must be provided for simultaneously extending and retracting the outboard tread wheels 5 and 8 along with the taking up and letting out of a portion of the overall length of the endless treads or belts 9. In these first described embodiments, the outboard and inboard tread wheel of each support assembly 11 and 12 are joined together in a fixed, radially spaced-apart manner by means of a suitable drag link 13 such that rectilinear displacement of any one of the inboard tread wheels 6 or 7 results in a concurrent and corresponding equal rectilinear displacement of the asssociated outboard tread wheel 5 and 8 connected thereto by means of the common drag links 13. This rectilinear displacement of the two support assemblies 11 and 12 on either side of the vehicle is obtained by the employment of any suitable adjustable means such as the illustrated extend-retract assemblies 14 each of which may include a central screw drive 15 from which extends rotatable screw shaft 16 (FIG. 2) connected in turn to an axle 17 of the inboard tread wheels 6 and 7 whereby upon actuation, by either manual or electric motor means, the screw drive 15 produces a rotary translation of the respective screw shaft 16 to rectilinearly displace the inboard tread wheels 6 or 7 as the axle 17 thereof travels upon the length of the screw shaft 16.

As the effective distance is altered between each pair of respective outboard tread wheels 5 and 8 it will be obvious that the corresponding effective length of the continuous or endless treads 9 must likewise be varied and this coordinated action is achieved by providing a suitable tread take-up assembly, generally designated 18—18' which additionally must maintain the entire extent of both treads 9—9 in a substantially taut condition throughout all positions of the support assemblies.

As shown in the embodiments of FIGS. 1 and 2, the tread take-up assemblies include a plurality of outside tread take-up rolls 19 which are fixedly journaled with respect to the frame side walls 3 and are preferably disposed in a common horizontal plane. Disposed laterally adjacent and intermediate the fixed tread take-up rolls 19 are a plurality of vertically displaceable inside tread take-up rolls 20 each having its axis slidably mounted with respect to the frame 2 such as by means of the vertically disposed slots or guides 21 in the side walls 3. The axial stub shafts 22 of all of the displaceable take-up rolls 20 on each side of the undercarriage 1 are fixed relative to one or more actuating bars 23. In the retracted position of FIG. 1 of the drawings, the body of the tread 9 will be seen to be looped or festooned about the plurality of elevated inside tread take-up rolls 20 and lowermost outside tread take-up rolls 19, with the external surface 24 of the treads engaging the periphery of the fixed rolls 19 while the internal surface 25 of the treads engage the periphery of the displaceable take-up rolls 20. Thus, a plurality of vertically disposed, elongated loops 26 are formed above and between the inboard tread wheels 6 and 7 and intermediate the two ends 27 of each of the endless treads 9—9.

As the four support assemblies 11 and 12 are displaced retilinearly from the retracted position of FIG. 1 to the extended position of FIG. 2 of the drawings, it will be seen that means must be actuated to allow for the increase of the effective available length of the endless tread as the two ends 27—27 of each tread 9 are moved further away from one another and this described required action is achieved by a collapse or decrease in the size of the elongated loops 26 formed in the upper reach of the treads 9. In view of the fixed disposition of the outside tread take-up rolls 19 it will follow that an extension of the outboard tread wheels 5 and 8 will pull the top reaches of each of the elevated elongated loops 26 downwardly with a concurrent lowering of the axles of of the inside tread take-up rolls 20.

Up to this point in the description of the present invention, the structure of the undercarriage 1 as disclosed in the two embodiments of FIG. 1 and FIG. 2 is identical. These two figures of the drawings include alternate means for producing a controlled vertical displacement of the take-up roll actuating bars 23 as the front and rear support assemblies 11-12 are selectively extended or contracted. FIG. 1 will be seen to disclose a pair of split actuating bars 23—23 each associated with a plurality of adjacent inside tread take-up rolls 20 and disposed on the inner surface of each of the carriage side walls 3. Between each pair of slots 21—21, an appropriate take-up bar motor 28 is disposed upon the frame base 4 and includes suitable motion transmitting means such as the screw shaft 28' having its distal portion attached to one of the take-up bars 23. The embodiment disclosed in FIG. 2 of the drawings discloses an alternative arrangement wherein a single take-up roll actuating bar 23 is joined to all of the inside tread take-up rolls 20 associated with each side wall 3 and thus a single take-up bar motor 28 is connected to each of these bars 23. And with this form the two actuating bars 23—23 are constantly urged into an upward direction by means of a plurality of springs 35 each of a construction selected to insure that when the front and rear support assemblies are fully contracted, all of the resultant slack in the treads 9—9 will be fully taken up and the undercarriage 1 will be in a position such as shown in FIG. 1 of the drawings.

A controlled downward displacement of each of the common take-up roll actuating bars 23 is achieved by means of a suitable take-up bar motor 28, which may alternatively comprise a precisely selected spring or other mechanical or electrical means selected to insure that at all times be absorbed by the upward displacement of the inside tread take-up rolls 20.

When the support assemblies 11 and 12 are in the fully extended position of FIG. 2 of the drawings, the plurality of fixed and displaceable take-up rolls 19 and 20 will be seen to be disposed in a common horizontal plane thereby allowing of the maximum effective available length for the treads and offering a maximum extended wheel base for the vehicle.

Any suitable motive drive means may be employed to alternately propel the variable terrain vehicle in either a forward or rearward direction such as by applying a rotary force to one or more of the tread wheels 5-8. More preferably, a pair of drive wheels 29—29, one each engaging the two endless treads 9 as shown in FIGS. 1 and 2 of the drawings are journaled in the side walls 3 intermediate the front and rear support assemblies 11-12. The shaft 30 of each drive wheel 29 is preferably fixedly journaled relative the frame 2 and each shaft 30 may be independently driven alternately in one direction or the other, by any well known means such as a high torque electric motor or by a manually actuated belt and gear means. Suitable drive means are shown in the embodiment of FIG. 1 of the drawings wherein it will be seen that a motor M includes an appropriate reducer R for transmitting motion by the way of the drive belt B to a driven pulley P directly associated with the axle 30 of the tread drive wheel 29.

Details relative the specific perferred construction of the endless tread 9 will become clear hereinafter however, for the purpose of the present discussion it will be understood that both the exterior surface 24 and the interior surface 25 of the tread 9 are preferably provided with a plurality of equally spaced, transversely extending cleats, ribs, or grooves. Such construction, particularly as it applies to the exterior surface 24, not only enhances the co-efficient of friction between the tread 9 and the surface upon which the vehicle is travelling but also permits of positive engagement between the endless treads 9 and the outer periphery of the drive wheels 29. Accordingly, it will be appreciated that the configuration of the drive wheel periphery 31 is selected to correspond with the configuration provided by the grooves formed on the exterior surface 24 of the treads 9 to insure a positive mechanical connection therebetween.

Traction between the drive wheels 29 and the constantly engaging portion of the treads 9 is additionally improved by locating the shaft 30 thereof at a point below the fixed tread take-up rolls 19 so that when the support assemblies 11-12 are in the extended position of FIG. 2 of the drawings, and the displaceable take-up rolls 20 are in the lowered or collapsed position, at least one half of the periphery of the larger diameter drive wheels 29 will still be enveloped by a portion of the respective endless treads 9.

Tracking of the variable terrain vehicle of the present invention is noticeably improved as is also the maneuverability therof particularly when making a turn, if the medial portion of the lower track 9' of the treads 9 is significantly elevated above the support surface and terminal portions of each lower track 9'. This arrangement in effect provides two spaced-apart foot-print contacts between each side of the vehicle and the supporting terrain structure and significantly reduces drag, digging, and scuffing between the exterior surface 24 of the lower track 9' and the engaged supporting surface beneath the two treads.

The above disposition of the lower tracks 9' may be achieved by numerous means such as by the provision of the fixedly journaled lower track lift roller 32 disposed below the drive wheel 29 with the exterior surface 24 of the adjacent tread 9 passing over the top of the roller 32 at a horizontal point disposed above the plane of the bottom of at least the inboard thread wheels 6 and 7. Such construction will insure that the lower or exterior surface 24 of the lower track 9' intermediate at least the two inboard tread wheels 6 and 7 will not engage the surface of a flat smooth terrain.

Figure 3:
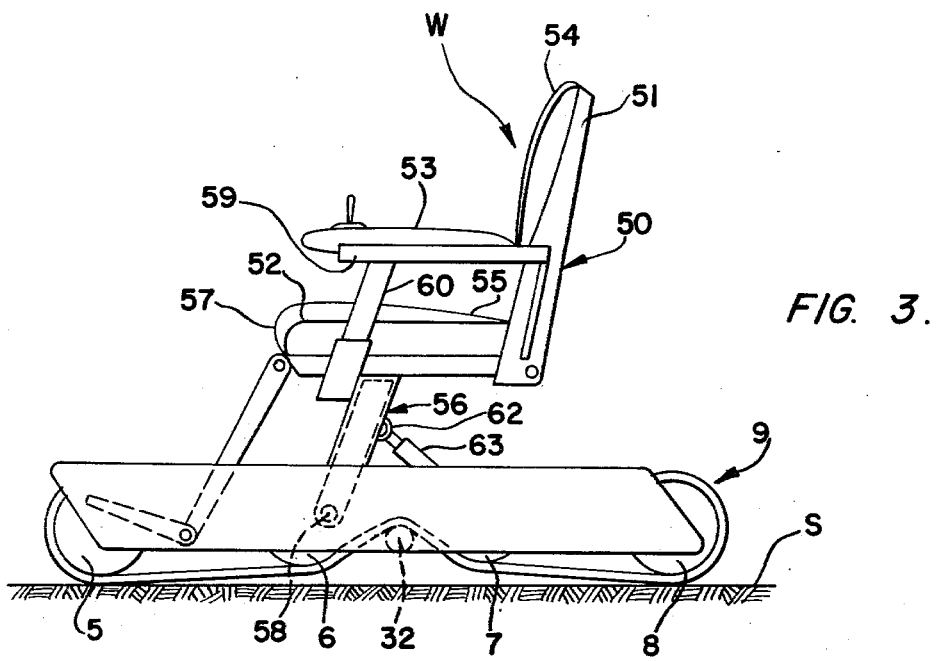
FIG. 3 is a side elevation of a further embodiment of the variable terrain vehicle of the present invention when associated with a chair assembly.

Additionally, the foot-prints offered by the exterior surface 24 of each lower track 9' may be further reduced to a point or transverse line contact immediately beneath only the two outboard tread wheels 5 and 8 on either side of the vehicle, if the diameter of the inboard tread wheels 6 and 7 is selected to be smaller than that of the outboard tread wheels 5 and 8 and/or the center axis of the axles 17 of the inboard tread wheels 6 and 7 is disposed at a point elevated with respect to the axles of the outboard tread wheels 5 and 8 as shown in the embodiment of FIG. 3 of the drawings.

Quite obviously, if only a rectilinear displacement of the support assemblies 11 and 12 were provided, the effectiveness of variable terrain negotiation by the vehicle of the present invention would be somewhat limited and obstacle negotiation would be a factor largely dependent upon the radius of the outboard tread wheels 5 and 8. The terrain negotiating capability of the disclosed apparatus is substantially increased by the inclusion of a variable pitch assembly, generally designated 33, associated with each of the support assemblies 11 and 12. Each variable pitch assembly 33 includes a control arm 34 connected at its outermost end relative the axle of the outboard tread wheels 5 and 8 and has its inboard end pivotally attached relative the axle of the adjacent inboard wheel and is connected to motor means (not shown) operable to raise or lower, in use, either the two front support assemblies 11 or the two rear support assemblies 12. This displacement of the pitch assemblies 33 may be made concurrently or independently and in the same or opposite directions according to the terrain or obstacle encountered.

In the above manner it will be understood that should the forward portion of the vehicle as shown in FIG. 2 of the drawings approach an elevated obstacle in the supporting terrain structure, the front support assemblies 11 would be elevated substantially 45° by the actuation of the control arms 34 and this elevation or upward pitch of the front support assemblies would be maintained as forward motion of the vehicle continues, until such time as the ends 27 of the tread are above the highest point of the obstacle, after which the inclined support assemblies 11 would be lowered to the original position, in alignment with the rear support assemblies 12. Alternatively, the assemblies 11—11 may be lowered below the horizontal position to a downwardly inclined position up to 45° to provide an increased area of contact between the exterior surface 24 of the lower track 9′ and the area intermediate the tread wheels 5 and 6 of the front support assemblies 11 until such time as the entire terrain vehicle is substantially horizontal with the supporting terrain. During the aforementioned sequence of operation, it will be understood that either concurrently or sequentially with respect to the angular displacement of the front support assemblies 11, the rear support assemblies 12, which are provided with similar variable pitch assemblies 33, may be likewise angularly elevated or depressed to maintain maximum surface contact and thus, traction force, between the exterior 24 of the lower track 9′ in the area intermediate the tread wheels 7 and 8 of the rear support assemblies 12.

Figure 4:
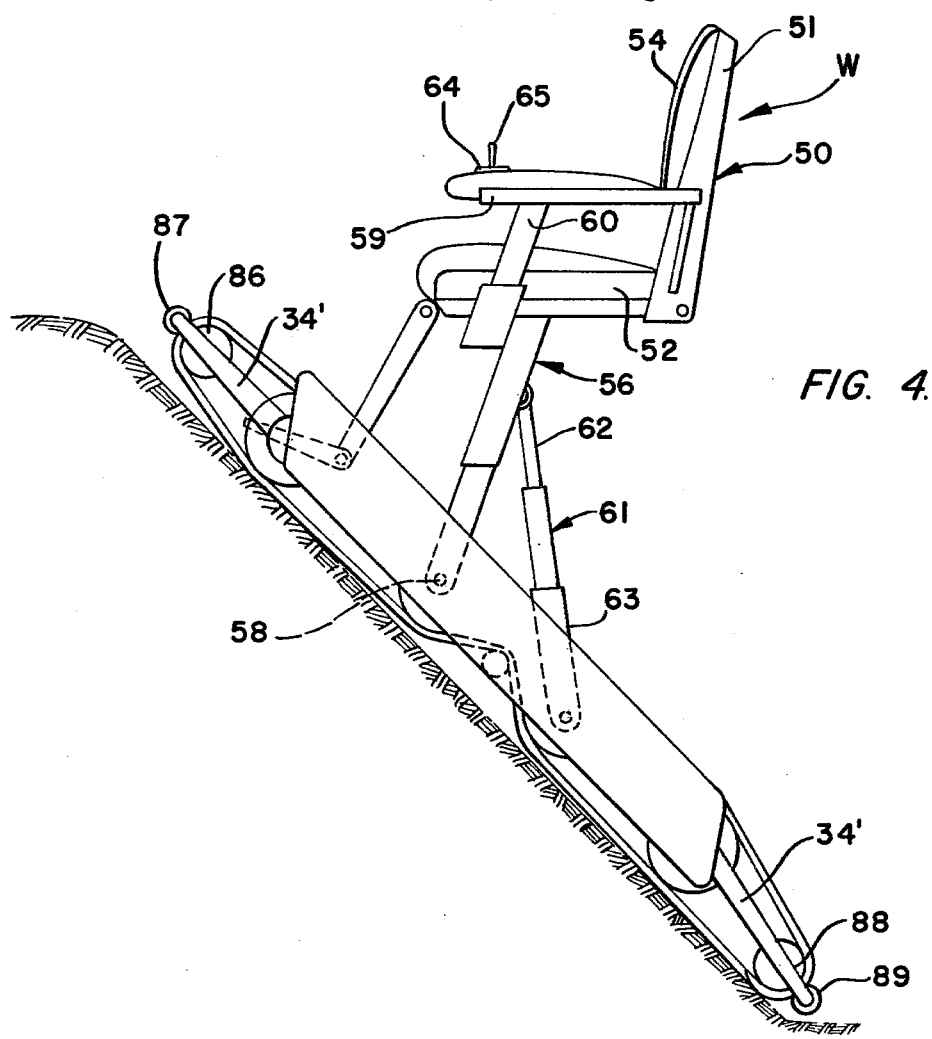
FIG. 4 is a side elevation of the vehicle of FIG. 3 with the wheelbase extended and as it appears when negotiating an incline.

With the basic construction and operation of the undercarriage 1 now understood, adaptations and further details thereof will now be described. A principal utilization of the aforementioned undercarriage 1 is with a wheelchair W especially constructed to provide improved transport of disabled or handicapped persons over variable terrain. As shown in FIGS. 3 and 4 of the drawings, the wheelchair W comprises the undercarriage 1 in combination with a chair assembly, generally designated 50. The chair assembly 50 includes a back 51 joined to the seat 52 and provided with a pair of spaced-apart lateral arms 53—53. Both the back 51 and seat 52 are provided with cushions 54 and 55 respectively, which are preferably constructed to offer a plurality of compartmented air cells (not shown) thereby noticeably improving the comfort factor for a user of the wheelchair W spending considerable time in the vehicle. The above described structure of the chair assembly 50 is joined to the undercarriage 1 by means of the seat support and control housing, generally designated 56 and which has its upper portions suitably affixed to the forward edge 57 of the seat 52 while the lower portion of the seat support and control housing 56 is pivotally attached, as at 58, to the base 4 of the undercarriage frame 2. Extending downwardly from the forward portion 59 of each arm 53 is an arm support and control housing 60 having its lowermost portion projecting beyond the lateral edges of the chair seat 52 and communicating with the upper portion of the sides of the seat support and control housing 56 for reasons which will be better understood hereinafter.

As mentioned above, the lowermost portion of the seat support and control housing 56 is pivotally attached to the undercarriage 1 as at 58 and by this arrangement an automatic adjustable positioning of the chair assembly 50 is achieved as the variable terrain vehicle or wheelchair W negotiates irregular terrain features resulting in constantly changing longitudinal inclinations of the undercarriage 1. This feature will be most clearly understood upon a comparative examination of FIGS. 3 and 4 of the drawings, wherein it will be seen that the seat 52 of the chair assembly 50 is maintained substantially horizontal regardless of the inclination of the undercarriage 1. This operation is achieved by means of an actuator assembly 61 having opposite ends respectively affixed to the seat support and control housing 56 at a point intermediate its pivot 58 and the chair seat 52 on the one hand and affixed to the frame 2 at a point well spaced rearwardly of the pivot 58, on the other hand.

The actuator assembly 61 may comprise any well known construction such as a fixed screw shaft 62 having one end at all times contained within a rotary screw drive 63 the latter of which may include a plurality of telescopic elements. Operation of the actuator assembly 61 with respect to the screw drive 63 results in an extension or contraction thereof and a resultant tilting or variation of the angular disposition between the seat support 56 and undercarriage 1. Thus, the components of the actuator assembly 61 produce either an extension such as shown in the alternate position of FIG. 4 of the drawings, or alternatively the components of the actuator assembly 61 may be fully retracted relative one another in order to maintain the chair seat 52 in a horizontal plane such as when the vehicle W is descending an inclined obstruction (not shown).

A suitable control unit 64 to permit operation of the various motors contained within the vehicle may be most conveniently located atop each of the forward portions 59 of the arms 53. These control units 64 should include, as a minimum, a readily manipulatable means such as a joy stick 65 which is well known in the electrical control switch art as a most effortless and instantly responsive means for operating a plurality of control units in an apparatus. The cables or other transmission elements associated therewith may most conveniently be disposed within the interior of the arm and seat control housings 60 and 56 respectively.

An entirely manual drive system for the terrain vehicle of the present invention is envisioned which can readily provide the necessary motive force especially in the case of an individual who has normal use of their hands and arms. With such an arrangement, the control unit 64 would be replaced by suitable actuating means such as crank handles journaled in either the arms 53 or arm support and control housings 60. The crank handles could be employed to actuate suitable transmission means disposed within the two housings 60 and 56. The transmission means could comprise rubber, plastic or metal chains or belts having their lowermost reaches operatively engaging alternatively, a suitable chair assembly actuator, the undercarriage motive drive wheels 29 and the variable pitch assemblies 33.

FIGS. 6 and 6A of the drawings disclose an adaption of manual actuating means and drive means associated with a wheelchair W′ and wherein all of the vehicle structure other than the specific drive and actuating means may be similar to that as disclosed in the embodiment of FIGS. 3 and 4, for example. A crank 66 includes a driving shaft 67 suitably journaled within the forward portion 59 of each arm 53 and adapted to be rotated in either direction by means of its offset handle 68. Extendable drive means, such as the upper arm belt 69 and lower seat belt 70 are carried within the chair arm and seat housings 60 and 56 and are inner-connected such as by the common belt drive shaft 71 whereby, actuation of the crank shaft 67 will be seen to produce a corresponding rotation of the belt drive shaft 71, and thus the lower reach 72 of the belt 70. By connecting the bottom of the belt reach 72 to drive means associated with the vehicle inboard tread wheel 6 it will be apparent that motive force may be readily transmitted from the crank 66 to the vehicle tread 9.

As shown in FIG. 6A, the endless belt 70 may include an integral, upper, horizontal reach 73 having spring takeup means 73' maintaining the belt 70 in the illustrated extended position throughout variations in the height of the chair seat during adjustment of the seat support and control housing 56. Likewise, suitable spring take-up means 74 are disposed within the arm 53 to accommodate variations in the height of the arm 53 during adjustment of the arm support and control housing 60.

The enlarged cross sectional view of FIG. 5 of the drawings is intended to most clearly illustrate a preferred embodiment for the construction of the endless tread 9 and its relationship to each of the wheels and rolls over which the treads travel. A flat, constant-thickness cleated tread construction will most certainly satisfactorily operate in association with the apparatus described heretofore however, employment of the construction shown in FIG. 5 of the drawings will be understood to provide still further improved maneuverability of the variable terrain vehicle of the present invention both on smooth, hard, supporting surfaces as well as while climbing or descending over irregularly configured supporting surfaces, whether rigid or of a shiftable consistency such as grassy or sandy spoil. With the construction shown in this figure the tread 9 will be seen to comprise lasts 75—75 preferably of polyvinyl material, each forming one half the basic construction of the tread and which are sandwiched about either side of a central welt, preferably formed of continuous filiment 76 of high tensile strength synthetic plastic monomers. Each last 75 is molded to provide a pair of lateral flange portions 77—77 disposed on either side of a central medial rib portion 78.

The foregoing construction will be understood to be symmetrical about both the horizontal and vertical axes thus resulting in an internal, central core 79 being formed by the two sandwiched rib portions 78—78. The internal central core 79 is preferably airtight, thus providing the equivalent of a high pressure continuous tire extending the full included length of each endless tread 9. Alternatively, means may be provided (not shown) to modify or regulate the pressure of air, or amount of a fluid contained within the central core 79 in order to vary the profile or characteristics of resiliency of the formed medial rib portion 78. Formed transversely of the tread 9 from one outer edge 80 to the other outer edge 80 are a plurality of transverse external cleats 81 on the exterior surface 24 while a plurality of similarly configured internal cleats 82 are formed in the interior surface 25 of the tread throughout its length. All of the cleats 81 and 82 are preferably formed of a square cross-section with the external cleats 81 being longitudinally off-set relative the adjacent internal cleats 82 thus allowing a reduction in the overall thickness of the material of the tread 9 without materially affecting its strength.

The tread wheels and take-up rolls about which the tread 9 passes may be constructed according to the arrangement shown in FIG. 5 of the drawings to provide for positive retention of the tread during operation of the vehicle. In this respect, it will be seen that the outboard tread wheel 5 is constructed of a pair of shell halves 83 joined by the central hub 84, the latter providing the journal for axle 17. Such an arrangement results in the formation of a circumferential groove or recess 85 between the two shell halves 83—83 and it is within at least a portion of this recess 85 that one half of the medial rib construction 78 is disposed thereby positively providing transverse retention of the tread about the wheel 6. Quite obviously not all of the tread wheels nor any of the take-up rolls 19 and 20 should be provided with cleats or teeth in the outer periphery 10 thereof since this would interfere with the taking up and letting out of the effective length of the endless tread 9 during the extension and retraction of the support assemblies 11 and 12. In the case of the drive wheel 29 however, it is most desirable that the outer periphery of this wheel be provided with mating external transverse 31' for constant meshing between the external cleats 81 of the constantly engaging exterior surface 24 of the treads 9.

Figure 7:
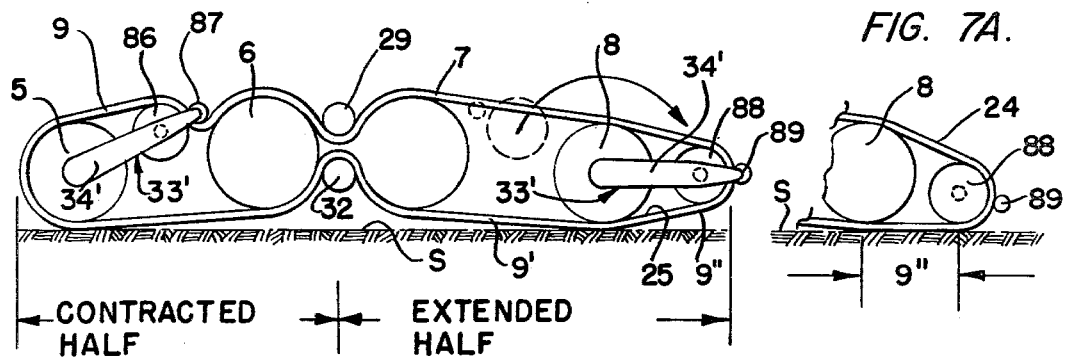
FIG. 7 is a side diagrammatic view of a further embodiment of the support assembly of the present invention.
Figure 7A:
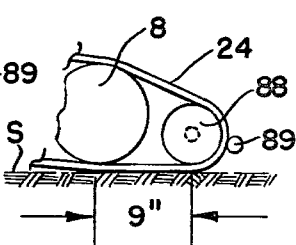
FIG. 7A is a fragmentary side elevation of an alternate position of the variable pitch assembly of the structure shown in FIG. 7
Figure 8:
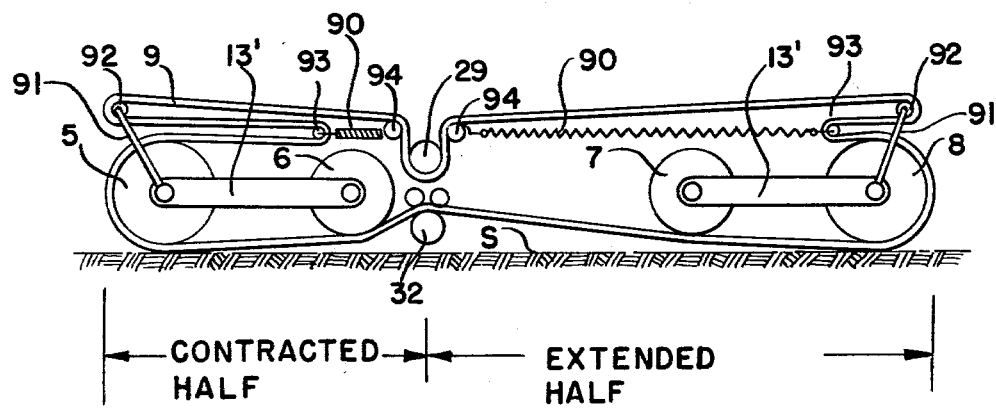
FIG. 8 is a view similar to FIG. 7 and illustrates still another embodiment of the support assembly.

FIGS. 7, 7A and 8 illustrate additional modifications of support assemblies which may be combined with the frame 2 of the present invention. In the embodiment of FIG. 7, extension, together with either elevation or depression of one or both of the ends of the treads, is achieved by alternate variable pitch means 33' including idler tread wheels 86 and 88 respectively, which are each swingably connected to the adjacent outboard tread wheels 5 and 8 by means of a link or control arm 34'. In this modification the previously described extend/retract drive assembly 14 is eliminated and instead, extension and contraction of the wheel base of the vehicle is achieved by the arcuate displacement or swinging of the two idler tread wheels 86 and 88 from the position such as shown in the left hand portion of FIG. 7 to the position shown in the right hand portion thereof. Take-up means for accumulating and letting out slack in the tread 9, such as shown in the embodiment of FIGS. 1-2, is not necessary in this modification since displacement of the idler tread wheels 86, 88 between alternate positions automatically allows variation in the effective length of the lower track 9' which will be juxtaposed the supporting surface S.

The interior surface 25 of the tread 9 is maintained in constant abutment with a portion of the exterior of the shiftable idler tread wheels 86,88 by means of keeper rolls 87, 89 respectively, which are carried by the variable pitch assemblies 33' and suitably mounted adjacent the periphery of the wheels 86,88 at a point designed to constantly bear against the exterior surface 24 of the tread at all times during displacement of the pitch assemblies 33' between their alternate positions. When in the position as shown in FIG. 7, it will be seen that the left one of the support assemblies has its variable pitch assembly 33' fully retracted while the right hand pitch assembly is extended outwardly with the center axis of the idler tread wheel 88 disposed substantially horizontal with the center axis of the outboard tread wheel 8 such that only a transverse line contact or foot-print exists between the vehicle and the supporting surface S while the outwardly extended variable pitch assembly 33' produces a partially elevated forward track section 9" which would be a typical position for the vehicle components as the right hand portion of the vehicle was approaching an elevated obstacle. If it is desired to increase the size of the footprint of either or both ends of the vehicle of FIG. 7 then the variable pitch assemblies 33' may be slightly lowered until the entire forward track section 9" engages the supporting surface S as shown in FIG. 7A of the drawings.

In the remaining embodiment illustrated in FIG. 8 of the drawings, a further modification is shown wherein either or both of the support assemblies may be selectively extended or contracted. Each support assembly includes an outboard tread wheel 5 or 8 joined to a respective inboard tread wheel 6 or 7 by means of a drag link 13'. Any suitable means such as the extend/retract drive assembly 14 of the first described embodiment may be employed to selectively shift the two drive assemblies between the alternate illustrated positions in order to vary the wheelbase of the undercarriage. In this form the non-utilized portion of the tread 9 is taken up and let out by longitudinally extending take-up means including the springs 90 and take-up arms 91. The angularly disposed take-up arms 91 are preferably fixed at one end relative the axle of the outboard tread wheels 5 and 8 and carry at their free ends a fixed inside tread take-up roll 92.

With the foregoing in mind, it will be seen that the tread 9 passes about substantially one-half the periphery of the outboard tread wheels and thence passes over a displaceable outside tread take-up roll 93 attached to the outer end of the springs 90. The tread then reverses direction toward the respective end of the undercarriage and passes about the fixed inside tread take-up roll 92 before again reversing direction and passing toward the center of the undercarriage and about a fixed guide roll 94 disposed adjacent the drive wheel 29. With the inner end of each spring 90 suitably anchored adjacent the fixed guide rolls 94 it will be understood that a constant inward force is applied by the springs to maintain the displaceable outside tread take-up rolls 93—93 under tension throughout the limit of travel of the support assemblies between the two illustrated retracted and extended positions such that at all times the tread 9 is maintained under proper tension as the wheelbase of the vehicle is altered with a corresponding variation in the distance between the line contact presented beneath the two outboard tread wheels 5 and 8 and the supporting terrain surface S.

We claim:

1. A vehicle having an undercarriage provided with a track laying assembly on both sides, each said track laying assembly including a front and rear support assembly, an endless belt tread encircling both said front and rear support assemblies of each said track laying assembly, each said support assembly including at least a pair of wheels within the confines of said tread, means connected to at least one said wheel of each said track laying assembly operable to displace said connected wheel toward and away from said wheels of the other said support assembly of the same track laying assembly in order to vary the effective ground engageable wheelbase of said vehicle, and tread take-up means engageable with said tread and operable during said variation of the wheelbase to take up and let out a portion of said endless treads.

2. A vehicle according to claim 1 wherein, each said track laying assembly support assembly includes outboard and inboard tread wheels aligned parallel with the fore-aft axis of said undercarriage.

3. A vehicle according to claim 1 wherein, each said track laying assembly support assembly includes outboard and inboard tread wheels aligned parallel with the fore-aft axis of said undercarriage, a link member pivotally joining said outboard and inboard tread wheels in a spaced apart manner, and said connected means varying said wheelbase includes an extend/retract drive assembly joined to each said inboard tread wheel.

4. A vehicle according to claim 1 wherein, each said track laying assembly support assembly includes outboard and inboard tread wheels aligned parallel with the fore-aft axis of said undercarriage, each said endless tread including a lower track extending between said outboard tread wheels of the respective track laying assembly, and means elevating the medial portion of each said lower track above the plane of the adjacent portions of said lower track.

5. A vehicle according to claim 1 wherein, each said track laying assembly support assembly includes outboard and inboard tread wheels aligned parallel with the fore-aft axis of said undercarriage, and said connected means varying said wheelbase includes an idler tread wheel within the confines of each said endless tread, said idler tread wheel pivotally attached to one end of a control arm having its other end pivoted to one said outboard tread wheel.

6. A vehicle according to claim 1 wherein, said tread take-up means includes a plurality of take-up rolls engaging each said endless tread and movable means operable to displace at least a portion of said take-up rolls to eliminate slack in each said tread during variation of said vehicle wheelbase.

7. A vehicle according to claim 1 including, a drive wheel engageable with each said tread, and means operable to actuate said drive wheels to propel said vehicle.

8. A vehicle according to claim 1 wherein, each said endless belt tread includes transversely extending cleats on at least its exterior surface.

9. A vehicle according to claim 1 wherein, each said endless belt tread includes a pair of lateral flange portions and a medial rib portion, said rib portion extending longitudinally of said tread and defining a thickness substantially greater than said flange portions.

10. A vehicle according to claim 1 including, a chair assembly provided with a seat mounted atop said undercarriage, said chair assembly having a seat support housing pivotally attached to said undercarriage, and an actuator assembly connected between said seat support housing and undercarriage and operable to tilt said seat support housing to maintain said seat in a horizontal plane as said undercarriage negotiates irregular terrain.

11. A vehicle according to claim 3 wherein, said extend/retract drive assembly includes a screw-drive having a rotary screw-shaft connected to said inboard tread wheel.

12. A vehicle according to claim 4 wherein, said elevating means includes a lift roller disposed intermediate said front and rear support assemblies and said lower track passes above said lift roller.

13. A vehicle according to claim 5 wherin, said idler tread wheel is displaceable from a position forward of said outboard tread wheel to a position rearwardly of said outboard tread wheel.

14. A vehicle according to claim 6 wherein, said take-up rolls include a plurality of fixed take-up rolls engaging the exterior surface of said tread and a plurality of displaceable take-up rolls engaging the interior surface of said tread.

15. A vehicle according to claim 7 wherein, said propelling means includes an electric motor connected to said drive wheels.

16. A vehicle according to claim 7 wherein, said propelling means includes a manually actuated crank and belt means transmitting motion from said crank to said drive wheel.

17. A vehicle according to claim 7 wherein, said drive wheel includes a plurality of teeth on its periphery and said tread is provided with external cleats mating with said teeth.

18. A vehicle according to claim 9 wherein, said rib portion is provided with a central hollow core.

19. A vehicle according to claim 9 wherein, said support assembly wheels each include a circumferential recess and said tread rib projecting from the interior surface of said tread is received in said recess.

20. A vehicle according to claim 10 including, a drive wheel engageable with each said tread, means operable to actuate said drive wheels to propel said vehicle, said propelling means including a manually actuated crank and belt means transmitting motion from said crank to said drive wheel.

21. A vehicle according to claim 12 wherein, the lower periphery of each said inboard tread wheel is disposed at a higher elevation than the lower periphery of said outboard tread wheels.

22. A vehicle according to claim 1 wherein, each said track laying support assembly includes outboard and inboard tread wheels normally aligned parallel with the fore-aft axis of said undercarriage, and at least one pair of said support assemblies each including an elongated member pivotally attached to a pair of said tread wheels of said pair of support assemblies whereby, said tread engaging said pivotally connected tread wheels may be elevated or depressed as the confined outboard-most of said pivotally connected tread wheels is elevated or depressed relative said fore-aft axis of said undercarriage.

23. A vehicle according to claim 1 wherein, each said track laying assembly support assembly includes outboard and inboard tread wheels aligned parallel with the fore-aft axis of said undercarriage, and a link member pivotally joining said outboard and inboard tread wheels in a fixed spaced apart manner.

* * * * *